(12) United States Patent
Johnson et al.

(10) Patent No.: US 12,352,996 B2
(45) Date of Patent: Jul. 8, 2025

(54) MULTILAYER OPTICAL FILM, ROLL OF MULTILAYER OPTICAL FILM, BACKLIGHT, AND DISPLAY SYSTEM

(71) Applicant: 3M INNOVATIVE PROPERTIES COMPANY, St. Paul, MN (US)

(72) Inventors: Matthew B. Johnson, Woodbury, MN (US); Takashi Fujita, Machida (JP); Jeffery N. Jackson, Madison, AL (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/695,519

(22) PCT Filed: Oct. 7, 2022

(86) PCT No.: PCT/IB2022/059625
§ 371 (c)(1),
(2) Date: Mar. 26, 2024

(87) PCT Pub. No.: WO2023/062494
PCT Pub. Date: Apr. 20, 2023

(65) Prior Publication Data
US 2024/0393522 A1    Nov. 28, 2024

Related U.S. Application Data

(60) Provisional application No. 63/262,356, filed on Oct. 11, 2021.

(51) Int. Cl.
*F21V 8/00*    (2006.01)
*G02B 5/30*    (2006.01)

(52) U.S. Cl.
CPC ......... *G02B 6/0056* (2013.01); *G02B 5/3025* (2013.01); *G02B 6/0025* (2013.01)

(58) Field of Classification Search
CPC .. G02B 6/0056; G02B 5/3025; G02B 6/0025; G02B 6/0053; B32B 27/08;
(Continued)

(56) References Cited

U.S. PATENT DOCUMENTS 11,156,757 B2 * 10/2021 Haag ................. G02F 1/133615
2005/0122587 A1    6/2005 Ouderkirk et al.
(Continued)

FOREIGN PATENT DOCUMENTS

KR    20010043528 A    5/2001

OTHER PUBLICATIONS

International Search report for PCT International Application No. PCT/IB2022/059625, mailed on Jan. 5, 2023, 4 pages.

*Primary Examiner* — Elmito Breval
(74) *Attorney, Agent, or Firm* — Clifton F. Richardson

(57) ABSTRACT

A multilayer optical film includes a plurality of alternating polymeric first and second layers numbering at least 20 in total. The polymeric first layers include between about 10% and 50% by weight of polyethylene terephthalate and between about 50% and 90% by weight of polyethylene naphthalate. For a substantially normally incident light and for a visible wavelength range, the multilayer optical film has respective average optical transmissions of between about 10% and 30% when the incident light is polarized along a first direction and greater than about 60% when the incident light is polarized along an in-plane orthogonal second direction. For a p-polarized incident light and for at least one wavelength in an infrared wavelength range, the multilayer optical film has optical transmissions T1 and T2 for respective incident angles of less than about 10 degrees and greater than about 40 degrees, wherein T2−T1 is less than about 40%.

13 Claims, 11 Drawing Sheets

(58) Field of Classification Search
CPC . B32B 2250/05; B32B 27/36; B32B 2250/42; B32B 2255/06; B32B 2255/20; B32B 2255/205; B32B 2270/00; B32B 2307/414; B32B 2307/416; B32B 2307/42; B32B 2307/7376

See application file for complete search history.

(56) References Cited

U.S. PATENT DOCUMENTS

| | | |
|---|---|---|
| 2017/0017117 A1 | 1/2017 | Shimizu et al. |
| 2020/0386931 A1 | 12/2020 | Johnson et al. |
| 2021/0048571 A1 | 2/2021 | Stover et al. |

\* cited by examiner

| | p-Polarized Incident Light 22 propagating in the Incident Plane P that includes the First Direction | | p-Polarized Incident Light 22 propagating in the Incident Plane P that includes the Second Direction | |
|---|---|---|---|---|
| | Multilayer Optical Film 200 | Conventional Optical Film | Multilayer Optical Film 200 | Conventional Optical Film |
| Visible Wavelength Range R1 | 6.19% | 0.35% | 97.64% | 95.95% |
| At least one Wavelength W1 | 58.80% | 52.43% | 99.11% | 99.40% |

FIG. 2D

| | Multilayer Optical Film 200 according to First Embodiment | Multilayer Optical Film 200 according to Second Embodiment | Conventional Optical Film |
|---|---|---|---|
| 1 | 1.593 | 1.569 | 1.699 |
| 2 | 1.585 | 1.565 | 1.709 |
| 3 | 1.564 | 1.530 | 1.712 |
| 4 | 1.547 | 1.525 | 1.710 |
| 5 | 1.543 | 1.536 | 1.712 |
| 6 | 1.529 | 1.527 | 1.705 |
| 7 | 1.525 | 1.486 | 1.713 |
| 8 | 1.518 | 1.468 | 1.693 |
| 9 | 1.513 | 1.471 | 1.695 |
| 10 | 1.528 | 1.499 | 1.708 |
| 11 | 1.522 | 1.507 | 1.694 |
| 12 | 1.531 | 1.506 | 1.703 |
| 13 | 1.529 | 1.525 | 1.699 |
| 14 | 1.546 | 1.527 | 1.700 |
| 15 | 1.551 | 1.546 | 1.717 |
| 16 | 1.569 | 1.551 | 1.717 |
| 17 | 1.585 | 1.569 | 1.708 |
| ET1 | 1.513 | 1.468 | 1.693 |
| ET2 | 1.593 | 1.569 | 1.717 |
| ET1/ET2 (%) | 95.00 | 93.60 | 98.60 |

FIG. 3C

MULTILAYER OPTICAL FILM, ROLL OF MULTILAYER OPTICAL FILM, BACKLIGHT, AND DISPLAY SYSTEM

CROSS REFERENCE TO RELATED APPLICATIONS

This application is a national stage filing under 35 U.S.C. 371 of PCT/IB2022/059625, filed Oct. 7, 2022, which claims the benefit of U.S. Application No. 63/262,356, filed Oct. 11, 2021, the disclosures of which are incorporated by reference in their entireties herein.

TECHNICAL FIELD

The present disclosure relates to a multilayer optical film. The present disclosure further relates to a roll of the multilayer optical film, a backlight including the multilayer optical film, and a display system including the backlight.

BACKGROUND

Display systems include backlights to provide light to a display panel. The backlights generally include multilayer optical films that may have a polarizing effect, i.e., the multilayer optical films may act as polarizers. Polarizers are optical elements that allow incident light of one polarization to be substantially transmitted through the polarizer, while substantially blocking light of another polarization.

SUMMARY

In a first aspect, the present disclosure provides a multilayer optical film including a plurality of alternating polymeric first and second layers numbering at least 20 in total. Each of the polymeric first and second layers has an average thickness of less than about 500 nanometers (nm). The polymeric first layers include between about 10% and about 50% by weight of polyethylene terephthalate (PET) and between about 50% and about 90% by weight of polyethylene naphthalate (PEN). For a substantially normally incident light and for a visible wavelength range extending from about 420 nm to about 680 nm, the plurality of alternating polymeric first and second layers has an average optical transmission of between about 10% and about 30% when the incident light is polarized along an in-plane first direction in the multilayer optical film. Further, for the substantially normally incident light and for the visible wavelength range, the plurality of alternating polymeric first and second layers has an average optical transmission of greater than about 60% when the incident light is polarized along an in-plane orthogonal second direction in the multilayer optical film. Furthermore, for a p-polarized incident light propagating in an incident plane that includes the first direction and for at least one wavelength in an infrared wavelength range extending from about 700 nm to about 960 nm, the plurality of alternating polymeric first and second layers has optical transmissions T1 and T2 for respective incident angles of less than about 10 degrees and greater than about 40 degrees, wherein (T2−T1) is less than about 40%.

In a second aspect, the present disclosure provides a roll of the multilayer optical film of the first aspect, having a width of at least 140 centimeters (cm) and a length of at least 40 meters (m). Along the length of the multilayer optical film, the multilayer optical film has an average effective transmission ET1 in a middle region and an average effective transmission ET2 in a side region, wherein (ET1/ET2) ≤0.97.

In a third aspect, the present disclosure provides a backlight including an extended illumination source configured to emit a light through and across an extended emission surface thereof for illuminating a display panel. The extended illumination source includes at least one light source. The backlight further includes the multilayer optical film of the first aspect disposed on, and substantially coextensive in length and width with, the extended emission surface.

In a fourth aspect, the present disclosure provides a display system including a display panel disposed on the backlight of the third aspect. The display panel is configured to receive the emitted light and form an image.

In a fifth aspect, the present disclosure provides a backlight including an extended illumination source configured to emit a light through and across an extended emission surface thereof for illuminating a display panel. The extended illumination source includes at least one light source. The backlight further includes a reflective polarizer disposed on, and substantially co-extensive in length and width with, the extended illumination source. The reflective polarizer includes a plurality of alternating polymeric first and second layers numbering at least 20 in total. Each of the polymeric first and second layers has an average thickness of less than about 500 nm. For a substantially normally incident light and for a visible wavelength range extending from about 420 nm to about 680 nm, the plurality of alternating polymeric first and second layers has an average optical transmission of between about 10% and about 30% when the incident light is polarized along an in-plane first direction in the reflective polarizer. Further, for the substantially normally incident light and for the visible wavelength range, the plurality of alternating polymeric first and second layers has an average optical transmission of greater than about 60% when the incident light is polarized along an in-plane orthogonal second direction in the reflective polarizer. Furthermore, the reflective polarizer has an average effective transmission of between about 1.65 and about 1.4.

In a sixth aspect, the present disclosure provides a display system including a display panel disposed on the backlight of the fifth aspect. The display panel is configured to receive the emitted light and form an image.

BRIEF DESCRIPTION OF DRAWINGS

Exemplary embodiments disclosed herein are more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

FIG. 2D illustrates a table listing some exemplary values of respective average optical transmissions and respective optical transmissions of the multilayer optical film and the conventional optical film, corresponding to the plot of FIG. 2C;

FIG. 3C illustrates a table listing some exemplary values of the respective average effective transmissions of the two multilayer optical films and the conventional optical film, corresponding to the plot of FIG. 3B;

DETAILED DESCRIPTION

Figure 1:
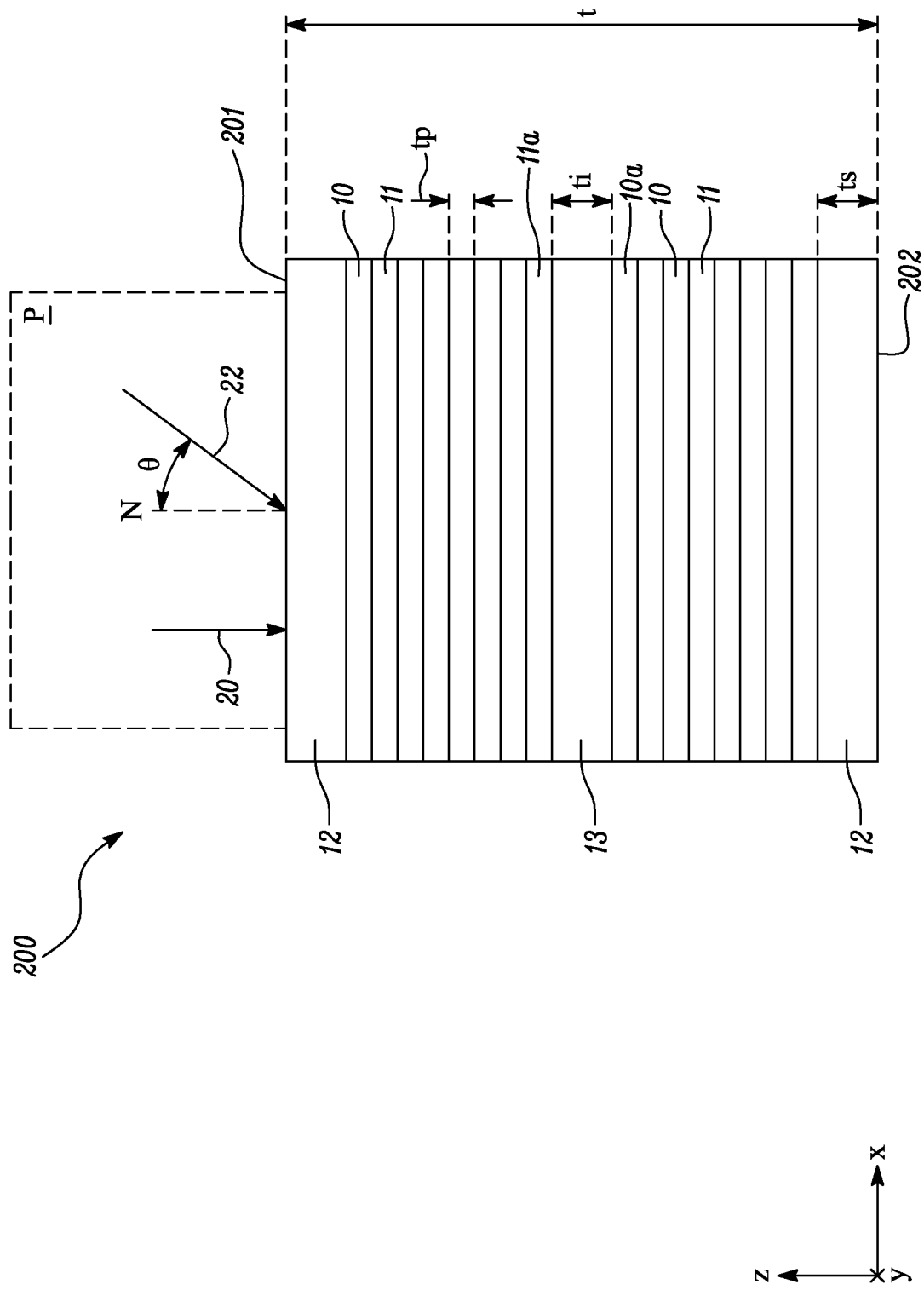
FIG. 1 illustrates a detailed schematic sectional view of a multilayer optical film, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

As used herein, all numbers should be considered modified by the term "about". The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, when a first material is termed as "similar" to a second material, at least 90 weight % of the first and second materials are identical and any variation between the first and second materials comprises less than about 10 weight % of each of the first and second materials.

As used herein, "at least one of A and B" should be understood to mean "only A, only B, or both A and B".

As used herein, the term "film" generally refers to a material with a very high ratio of length or width to thickness. A film has two major surfaces defined by a length and width. Films typically have good flexibility and can be used for a wide variety of applications, including displays. Films may also be of thickness or material composition, such that they are semi-rigid or rigid. Films described in the present disclosure may be composed of various polymeric materials. Films may be monolayer, multilayer, or blend of different polymers.

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers. As used herein, the term "between about", unless otherwise specifically defined, generally refers to an inclusive or a closed range. For example, if a parameter X is between about A and B, then A≤X≤B.

As used herein, the term "index", unless otherwise specifically defined, generally refers to a refractive index of a material or a layer. Similarly, the term "indices", unless otherwise specifically defined, generally refers to refractive indices of multiple materials or layers.

Multilayer optical films, for example, reflective polarizers may be used in applications where there may be a requirement to allow light of one polarization to be substantially transmitted through the polarizer, while substantially blocking light of another polarization.

Conventional multilayer optical films may substantially transmit a substantially normally incident light polarized along a first direction and substantially block a substantially normally incident light polarized along an orthogonal second direction in a desired wavelength range.

However, in some applications, there may be a need to transmit a portion of the substantially normally incident light polarized along the second direction in the desired wavelength range.

Further, in some applications, the multilayer optical film may be exposed to solvents such as isopropyl alcohol (IPA), acetone, toluene, methyl ethyl ketone (MEK), etc., which may damage the multilayer optical film. Hence, in some applications, multilayer optical films having a chemical resistance may be desirable.

In an aspect, the present disclosure provides a multilayer optical film including a plurality of alternating polymeric first and second layers numbering at least 20 in total. Each of the polymeric first and second layers has an average thickness of less than about 500 nanometers (nm). The polymeric first layers include between about 10% and about 50% by weight of polyethylene terephthalate (PET) and between about 50% and about 90% by weight of polyethylene naphthalate (PEN). For a substantially normally incident light and for a visible wavelength range extending from about 420 nm to about 680 nm, the plurality of alternating polymeric first and second layers has an average optical transmission of between about 10% and about 30% when the incident light is polarized along an in-plane first direction in the multilayer optical film. Further, for the substantially normally incident light and for the visible wavelength range, the plurality of alternating polymeric first and second layers has an average optical transmission of greater than about 60% when the incident light is polarized along an in-plane orthogonal second direction in the multilayer optical film. Furthermore, for a p-polarized incident light propagating in an incident plane that includes the first direction and for at least one wavelength in an infrared wavelength range extending from about 700 nm to about 960 nm, the plurality of alternating polymeric first and second layers has optical transmissions T1 and T2 for respective incident angles of less than about 10 degrees and greater than about 40 degrees, wherein (T2−T1) is less than about 40%.

Since the polymeric first layers include between about 10% and about 50% by weight of PET and between about 50% and about 90% by weight of PEN, the multilayer optical film may have the average optical transmission of between about 10% and about 30% for the substantially normally incident light in the visible wavelength range when the incident light is polarized along the first direction. In other words, the multilayer optical film may be a weak polarizer. Such polarizers may be desirable in several optical applications including windshield, Virtual Reality/Augmented Reality, and heads-up display (HUD) applications.

Further, since (T2−T1) is less than about 40%, the multilayer optical film transmits at least a portion of the p-polarized incident light irrespective of the incident angle of the p-polarized incident light, for the at least one wavelength in the infrared wavelength range.

Furthermore, applying one or more of IPA, acetone, toluene, and MEK to the multilayer optical film may not damage the multilayer optical film of the present disclosure. Therefore, the multilayer optical film may be used in applications that require chemical resistance to one or more of the above-mentioned solvents.

Referring now to figures, FIG. 1 illustrates a detailed schematic sectional view of a multilayer optical film 200, according to an embodiment of the present disclosure. The multilayer optical film 200 defines mutually orthogonal x-, y-, and z-axes. The x- and y-axes correspond to in-plane axes of the multilayer optical film 200, while the z-axis is a transverse axis disposed along a thickness of the multilayer optical film 200. In other words, the x- and y-axes are disposed along a plane (i.e., the x-y plane) of the multilayer optical film 200, and the z-axis is disposed perpendicular to the plane of the multilayer optical film 200. The multilayer optical film 200 further defines mutually orthogonal first, second, and thickness directions. The first, second, and thickness directions may be substantially along the x-, y-, and z-axes, respectively, of the multilayer optical film 200.

In some embodiments, the multilayer optical film 200 includes opposing outermost surfaces 201, 202. In some embodiments, at least one of the opposing outermost surfaces 201, 202 may be exposed to an external environment. In some embodiments, each of the opposing outermost surfaces 201, 202 may be exposed to an external environment. In some embodiments, the external environment may include air.

The multilayer optical film 200 includes a plurality of alternating polymeric first and second layers 10, 11 numbering at least 20 in total. In some embodiments, the plurality of polymeric first and second layers 10, 11 numbers at least 30, at least 40, at least 50, at least 75, at least 100, at least 150, at least 200, at least 250, or at least 300 in total.

Each of the polymeric first and second layers 10, 11 has an average thickness tp of less than about 500 nanometers (nm). The average thickness tp is defined along the z-axis of each of the polymeric first and second layers 10, 11. The term "average thickness tp", as used herein, refers to an average of thicknesses of each of the polymeric first and second layers 10, 11 measured at multiple points across a plane (i.e., the x-y plane) of each of the polymeric first and second layers 10, 11. In some embodiments, each of the polymeric first and second layers 10, 11 has the average thickness tp of less than about 400 nm, less than about 300 nm, less than about 250 nm, less than about 200 nm, less than about 150 nm, less than about 100 nm, or less than about 50 nm.

The polymeric first layers 10 include between about 10% and about 50% by weight of polyethylene terephthalate (PET). In some embodiments, the polymeric first layers 10 include between about 20% and about 40% by weight of PET. In some embodiments, the polymeric first layers 10 include about 30% by weight of PET. In some embodiments, the polymeric first layers 10 include between about 10% and about 50% by weight of a copolymer of PET (coPET). In some embodiments, the polymeric first layers 10 include between about 20% and about 40% by weight of the coPET. In some embodiments, the polymeric first layers 10 include about 30% by weight of the coPET.

The polymeric first layers 10 further include between about 50% and about 90% by weight of polyethylene naphthalate (PEN). In some embodiments, the polymeric first layers 10 include between about 60% and about 80% by weight of PEN. In some embodiments, the polymeric first layers 10 include about 70% by weight of PEN. In some embodiments, the polymeric first layers 10 include between about 50% and about 90% by weight of LmPEN (a stoichiometric blend of about 90% of PEN and about 10% of PET). In some embodiments, the polymeric first layers 10 include between about 60% and about 80% by weight of LmPEN. In some embodiments, the polymeric first layers 10 include about 70% by weight of LmPEN.

In some embodiments, the polymeric second layers 11 include polycarbonate (PC) and a coPET. In some embodiments, the polymeric second layers 11 may include between about 35% and about 50% by weight of PC and between about 50% and about 65% by weight of the coPET.

In some embodiments, the multilayer optical film 200 further includes at least one skin layer 12 having an average thickness ts of greater than about 500 nm. The average thickness ts is defined along the z-axis of the at least one skin layer 12. The term "average thickness ts", as used herein, refers to an average of thicknesses of the at least one skin layer 12 measured at multiple points across a plane (i.e., the x-y plane) of the at least one skin layer 12. In some embodiments, the at least one skin layer 12 has the average thickness ts of greater than about 750 nm, greater than about 1000 nm, greater than about 1500 nm, or greater than about 2000 nm. The at least one skin layer 12 may act as a protective layer for the multilayer optical film 200. In the illustrated embodiment of FIG. 1, the multilayer optical film 200 includes a pair of opposing skin layers 12 including the opposing outermost surfaces 201, 202. The pair of skin layers 12 of the multilayer optical film 200 may act as protective boundary layers (PBL).

In some embodiments, the multilayer optical film 200 further includes at least one intermediate layer 13 disposed between two of the alternating polymeric first and second layers 10, 11. In the illustrated embodiment of FIG. 1, the multilayer optical film 200 includes one intermediate layer 13 disposed between polymeric first and second layers 10a, 11a. In some embodiments, the at least one intermediate layer 13 has an average thickness ti of greater than about 500 nm. The average thickness ti is defined along the z-axis of the at least one intermediate layer 13. The term "average thickness ti", as used herein, refers to an average of thicknesses of the at least one intermediate layer 13 measured at multiple points across a plane (i.e., the x-y plane) of the at least one intermediate layer 13. In some embodiments, the at least one intermediate layer 13 has the average thickness ti of greater than about 750 nm, greater than about 1000 nm, greater than about 1500 nm, or greater than about 2000 nm.

In some embodiments, the at least one skin layer 12 and the at least one intermediate layer 13 may include one or more polymeric materials, for example, polyhexylethylene naphthalate (PHEN), PEN, copolymers containing PHEN, PEN and/or other polyesters (e.g., PET or polyesters containing dibenzoic acid), glycol modified polyethylene terephthalate (PETg), PC, poly (methyl methacrylate) (PMMA), or blends of these classes of materials.

In some embodiments, the polymeric first and second layers 10, 11, the at least one skin layer 12, and the at least one intermediate layer 13 may be substantially co-extensive with each other, or of comparable in-plane dimensions (i.e., length and width). In other words, the polymeric first and second layers 10, 11, the at least one skin layer 12, and the at least one intermediate layer 13 may be substantially co-extensive with each other in the x-y plane.

The multilayer optical film 200 may have an average thickness t based on desired application attributes. The average thickness t is defined along the z-axis of the multilayer optical film 200. The term "average thickness t", as used herein, refers to an average of thicknesses of the multilayer optical film 200 measured at multiple points across a plane (i.e., the x-y plane) of the multilayer optical film 200. In some embodiments, the multilayer optical film 200 has the average thickness t of less than about 40 microns. In some embodiments, the multilayer optical film 200 has the average thickness t of less than about 35 microns, less than about 32 microns, less than about 30 microns, less than about 28 microns, or less than about 27 microns. In some embodiments, the multilayer optical film 200 has the average thickness t of about 26 microns. Therefore, the multilayer optical film 200 may have an average thickness comparable to an average thickness of a conventional multilayer optical film.

In some embodiments, the multilayer optical film 200 may include additional layers, such as bonding layers (not shown) to bond any two of the plurality of polymeric first and second layers 10, 11, the at least one skin layer 12, and the at least one intermediate layer 13 of the multilayer optical film 200. In some embodiments, the bonding layers may be substantially optically clear. The term "optically clear", as used herein, may mean having an average optical transmittance of greater than about 90% for a light in a wavelength range from about 400 nm to about 1000 nm. In some embodiments, the bonding layers may include an optically clear adhesive (OCA). In some other embodiments, the bonding layers may include epoxy, lamination, or any other suitable layer.

In some embodiments, a minimum average peel strength between two portions of the multilayer optical film 200 is greater than about 100 grams per inch (g/inch). The term "average peel strength" as used herein, refers to an average load per unit width applied on the bonding layer in order to separate the two portions of the multilayer optical film 200. In some embodiments, each of the two portions includes at least one polymeric layer 10, 11 in the plurality of alternating polymeric first and second layers 10, 11. In some embodiments, at least one of the two portions may include the at least one intermediate layer 13. In some embodiments, the minimum average peel strength between the two portions of the multilayer optical film 200 is greater than about 150 g/inch, greater than about 200 g/inch, greater than about 250 g/inch, greater than about 300 g/inch, greater than about 350 g/inch, greater than about 400 g/inch, greater than about 450 g/inch, or greater than about 500 g/inch.

In some embodiments, the polymeric first and second layers 10, 11 have respective indices nx1 and nx2 along the first direction (i.e., the x-axis) of the multilayer optical film 200. In some embodiments, the polymeric first and second layers 10, 11 have respective indices ny1 and ny2 along the second direction (i.e., the y-axis) of the multilayer optical film 200. In some embodiments, the polymeric first and second layers 10, 11 have respective indices nz1 and nz2 along the thickness direction (i.e., the z-axis) of the multilayer optical film 200 orthogonal to the first and second directions.

In some embodiments, for at least one wavelength in a visible wavelength range 21 (shown in FIG. 2A) extending from about 420 nm to about 680 nm, a difference between nx1 and nx2 is greater than or equal to about 0 and less than or equal to about 0.4, i.e., $0 \le (nx1-nx2) \le 0.4$. In some embodiments, for the at least one wavelength in the visible wavelength range 21, $0 \le (nx1-nx2) \le 0.35$, $0 \le (nx1-nx2) \le 0.3$, $0 \le (nx1-nx2) \le 0.25$, $0 \le (nx1-nx2) \le 0.2$, or $0 \le (nx1-nx2) \le 0.15$. In some embodiments, for the at least one wavelength of about 633 nm, nx1 is between about 1.75 and about 1.85. In some embodiments, for the at least one wavelength of about 633 nm, nx2 is between about 1.55 and about 1.57.

In some embodiments, for the at least one wavelength in the visible wavelength range 21, a magnitude of a difference between ny1 and ny2 is less than about 0.04, i.e., $|ny1-ny2|<0.04$. In some embodiments, $|ny1-ny2|<0.035$, $|ny1-ny2|<0.03$, or $|ny1-ny2|<0.025$. In some embodiments, for the at least one wavelength in the visible wavelength range 21, ny1 and ny2 may be substantially equal and the magnitude of the difference between ny1 and ny2 may be 0, i.e., $|ny1-ny2|$ may be 0. In some embodiments, for the at least one wavelength of about 633 nm, ny1 is between about 1.57 and about 1.56, and ny2 is between about 1.55 and about 1.57.

In some embodiments, for the at least one wavelength in the visible wavelength range 21, a magnitude of a difference between nz1 and nz2 is less than about 0.04, i.e., $|nz1-nz2|<0.04$. In some embodiments, $|nz1-nz2|<0.035$, $|nz1-nz2|<0.03$, or $|nz1-nz2|<0.025$. In some embodiments, for the at least one wavelength in the visible wavelength range 21, nz1 and nz2 may be substantially equal and the magnitude of the difference between nz1 and nz2 may be 0, i.e., $|nz1-nz2|$ may be 0. In some embodiments, for the at least one wavelength of about 633 nm, nz1 is between about 1.53 and about 1.57, and nz2 is between about 1.54 and about 1.57.

In some embodiments, for the at least one wavelength in the visible wavelength range 21, at least one of nx1, ny1, nz1 may be greater than nx2, ny2, nz2, respectively. Therefore, for the at least one wavelength in the visible wavelength range 21, and at least along one of the first direction, the second direction, and the thickness direction, the polymeric first layers 10 may be high index optical (HIO) layers and the polymeric second layers 11 may be low index optical (LIO) layers. In some embodiments, for the at least one wavelength in the visible wavelength range 21, each of nx1, ny1, nz1 may be greater than nx2, ny2, nz2, respectively.

Generally, birefringence refers to a measure of optical anisotropy in a layer of the multilayer optical film 200. Moreover, birefringence is measured as a difference between two indices of the layer along two mutually perpendicular directions (e.g., the first and second directions).

It may be observed that, for the at least one wavelength of about 633 nm, and for the polymeric first layers 10, the birefringence |nx1−ny1| is between about 0.1 and about 0.29, the birefringence |nx1−nz1| is between about 0.1 and about 0.32, and the birefringence |ny1−nz1| is between about 0 and about 0.04.

Further, it may be observed that, for the at least one wavelength of about 633 nm, and for the polymeric second layers 11, the birefringence |nx2−ny2| is between about 0 to about 0.02, the birefringence |nx2−nz2| is between about 0 and about 0.03, and the birefringence |ny2−nz2| is between about 0 and about 0.03.

Therefore, the polymeric first and second layers 10, 11 of the multilayer optical film 200 may have a lower birefringence. The lower birefringence may result in a higher transmission of an incident light through the polymeric first and second layers 10, 11 of the multilayer optical film 200. Further, the lower birefringence of the polymeric first layers 10 may be due to an inclusion of 10% to 50% by weight of PET in the polymeric first layers 10. In some embodiments, desired optical properties of the multilayer optical film 200 may be achieved by varying various parameters, such as at least one of materials, a total number, and average thicknesses of the plurality of alternating polymeric first and second layers 10, 11, the at least one skin layer 12, and the at least one intermediate layer 13. Further, the desired optical properties of the multilayer optical film 200 may be achieved by varying at least one of the indices nx1, ny1, nz1, nx2, ny2, and nz2 of the plurality of polymeric first and second layers 10, 11.

In some embodiments, the multilayer optical film 200 may be a reflective polarizer. In such embodiments, the multilayer optical film 200 may be interchangeably referred to as "the reflective polarizer 200". Therefore, the reflective polarizer 200 includes the plurality of alternating polymeric first and second layers 10, 11 numbering at least 20 in total.

FIG. 1 further illustrates an incident light 20 propagating in an incident plane P that includes the first direction (i.e., the x-axis) and incident on the plurality of alternating polymeric first and second layers 10, 11 of the multilayer optical film 200 on the outermost surface 201 of the multilayer optical film 200. In such embodiments, the incident plane P is substantially along the x-z plane of the multilayer optical film 200. The incident light 20 is incident substantially normally on the plurality of alternating polymeric first and second layers 10, 11, i.e., the incident light 20 makes an angle of less than about 10 degrees with a normal N to the multilayer optical film 200 along the z-axis or the thickness direction of the multilayer optical film 200. Therefore, the incident light 20 may be interchangeably referred to as "the substantially normally incident light 20".

In some embodiments, the incident light 20 propagating in the incident plane P may be polarized along the in-plane first direction in the multilayer optical film 200. In other words, in such embodiments, the incident light 20 propagating in the incident plane P may be polarized along the x-axis in the multilayer optical film 200. In some embodiments, the incident light 20 propagating in the incident plane P may be polarized along the in-plane orthogonal second direction in the multilayer optical film 200. In other words, in such embodiments, the incident light 20 propagating in the incident plane P may be polarized along the y-axis in the multilayer optical film 200.

FIG. 1 further illustrates an incident light 22 propagating in the incident plane P that includes the first direction (i.e., the x-axis) and incident on the plurality of alternating polymeric first and second layers 10, 11 of the multilayer optical film 200 on the outermost surface 201 of the multilayer optical film 200. The incident light 22 is incident on the plurality of alternating polymeric first and second layers 10, 11 at an incident angle θ with respect to the normal N. In some embodiments, the incident angle θ is less than about 10 degrees. In some embodiments, the incident angle θ is less than about 8 degrees, less than about 6 degrees, less than about 4 degrees, less than about 2 degrees, or less than about 1 degree. In some embodiments, the incident angle θ is about 0 degree. In such embodiments, the incident light 22 may be equivalent to the substantially normally incident light 20. In some embodiments, the incident angle θ is greater than about 40 degrees. In some embodiments, the incident angle θ is greater than about 45 degrees, greater than about 50 degrees, or greater than about 55 degrees. In some embodiments, the incident angle θ is about 60 degrees.

In some embodiments, the incident light 22 propagating in the incident plane P that includes the first direction may be a p-polarized incident light. In such embodiments, the incident light 22 may be interchangeably referred to as "the p-polarized incident light 22 propagating in the incident plane P that includes the first direction".

In some embodiments, the incident plane P' (not shown) includes the orthogonal second direction (i.e., the y-axis). In such embodiments, the incident plane P is substantially along the y-z plane of the multilayer optical film 200. In some embodiments, the incident light 22 propagating in the incident plane P' that includes the second direction may be a p-polarized incident light. In such embodiments, the incident light 22 may be interchangeably referred to as "the p-polarized incident light 22 propagating in the incident plane P' that includes the second direction".

Figure 2A:
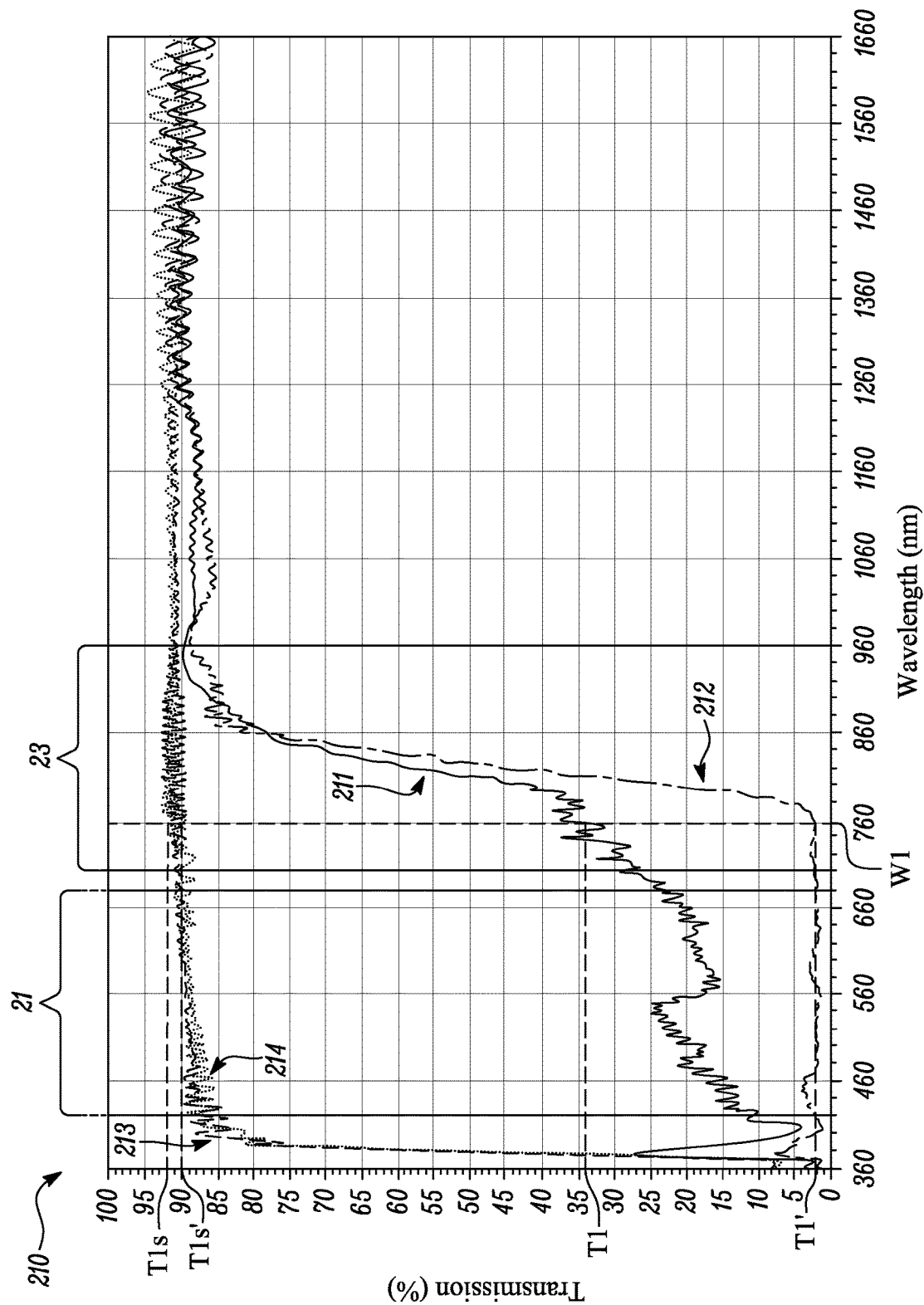
FIG. 2A illustrates a plot depicting respective optical transmissions of the multilayer optical film of FIG. 1 and a conventional optical film for a substantially normally incident light, according to an embodiment of the present disclosure.

FIG. 2A illustrates a plot 210 depicting respective optical transmissions of the multilayer optical film 200 (shown in FIG. 1) and a conventional optical film for the substantially normally incident light 20 (shown in FIG. 1), according to an embodiment of the present disclosure. Specifically, the plot 210 illustrates the respective optical transmissions of the multilayer optical film 200 and the conventional optical film for the substantially normally incident light 20 polarized along the first direction and polarized along the orthogonal second direction. FIG. 2A further depicts respective optical transmissions of the multilayer optical film 200 and the conventional optical film for the p-polarized incident light 22 propagating in the incident plane P that includes the first direction and for the p-polarized incident light 22 propagating in the incident plane P' that includes the second direction, and incident at the incident angle θ of less than about 10 degrees. Wavelength is expressed in nanometers (nm) in the abscissa. Optical transmission is expressed as a transmission percentage in the left ordinate axis.

In some embodiments, the conventional optical film may have a structure that is substantially similar to the multilayer optical film 200. However, a plurality of first layers of the conventional optical film may include about 100% by weight of LmPEN.

Referring now to FIGS. 1 and 2A, the plot 210 includes a curve 211 corresponding to the optical transmission of the plurality of alternating polymeric first and second layers 10, 11 for the substantially normally incident light 20 propagating in the incident plane P and polarized along the first direction in the multilayer optical film 200. The curve 211 therefore corresponds to the optical transmission of the plurality of alternating polymeric first and second layers 10, 11 for the p-polarized incident light 22 propagating in the incident plane P that includes the first direction and for the incident angle θ of less than about 10 degrees.

The plot 210 further includes a curve 212 corresponding to the optical transmission of the conventional optical film for the substantially normally incident light 20 propagating in the incident plane P and polarized along the first direction in the conventional optical film. The curve 212 therefore corresponds to the optical transmission of the conventional optical film for the p-polarized incident light 22 propagating in the incident plane P that includes the first direction and for the incident angle θ of less than about 10 degrees.

The plot 210 further includes a curve 213 corresponding to the optical transmission of the plurality of alternating polymeric first and second layers 10, 11 for the substantially normally incident light 20 propagating in the incident plane P' and polarized along the second direction in the multilayer optical film 200. The curve 213 therefore corresponds to the optical transmission of the plurality of alternating polymeric first and second layers 10, 11 for the the p-polarized incident light 22 propagating in the incident plane P' that includes the second direction and for the incident angle θ of less than about 10 degrees.

The plot 210 further includes a curve 214 corresponding to the optical transmission of the conventional optical film for the substantially normally incident light 20 propagating in the incident plane P' and polarized along the second orthogonal direction in the conventional optical film. The curve 214 therefore corresponds to the optical transmission of the conventional optical film for the p-polarized incident light 22 propagating in the incident plane P' that includes the second direction and for the incident angle θ of less than about 10 degrees.

Figure 2B:
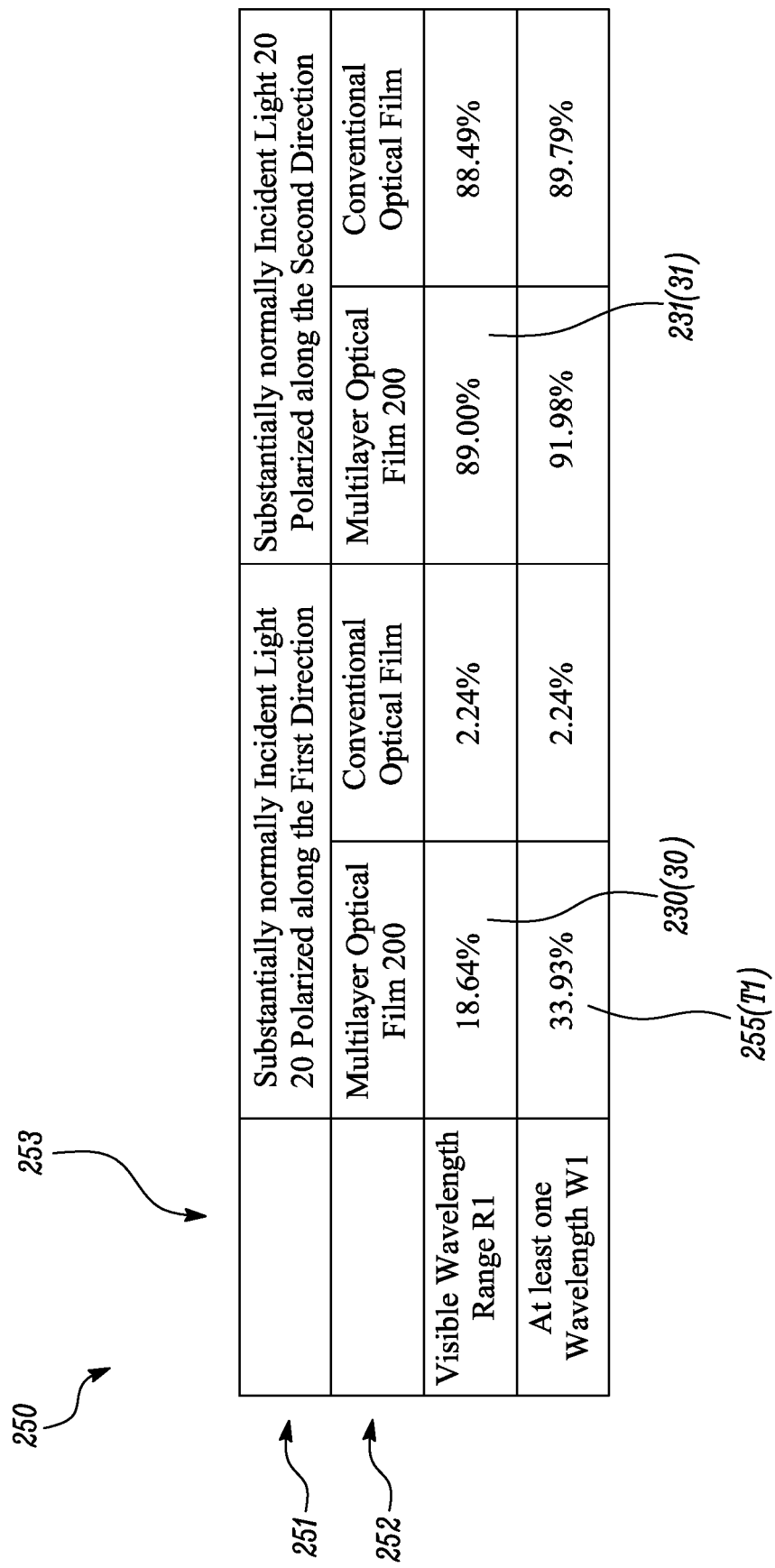
FIG. 2B illustrates a table listing some exemplary values of respective average optical transmissions and respective optical transmissions of the multilayer optical film and the conventional optical film, corresponding to the plot of FIG. 2A.

FIG. 2B illustrates a table 250 listing some exemplary values of respective average optical transmissions of the multilayer optical film 200 (shown in FIG. 1) and the conventional optical film for the substantially normally incident light 20 (shown in FIG. 1) and for the visible wavelength range 21. The table 250 further lists some exemplary values of respective optical transmissions of the multilayer optical film 200 and the conventional optical film for the substantially normally incident light 20 and for at least one wavelength W1 in an infrared wavelength range 23 (shown in FIG. 2A) extending from about 700 nm to about 960 nm. The table 250 corresponds to the plot 210 of FIG. 2A.

The table 250 includes multiple column headings in a row 251. The column headings in the row 251 includes the substantially normally incident light 20 polarized along the first direction and the substantially normally incident light 20 polarized along the second direction. The table 250 further includes multiple column sub-headings in a row 252. The column sub-headings in the row 252 includes the multilayer optical film 200 and the conventional optical film for each of the substantially normally incident light 20 polarized along the first direction and the substantially normally incident light 20 polarized along the second direction. A column 253 includes the visible wavelength range 21 (about 420 nm to about 680 nm) and the at least one wavelength W1 (about 760 nm) in the infrared wavelength range 23 (about 700 nm to about 960 nm).

The table 250 includes a cell 230 indicative of a value of an average optical transmission 30 of the multilayer optical film 200 for the visible wavelength range 21 and for the substantially normally incident light 20 polarized along the first direction. The table 250 further includes a cell 231 indicative of a value of an average optical transmission 31 of the multilayer optical film 200 for the visible wavelength range 21 and for the substantially normally incident light 20 polarized along the second direction. The table 250 further includes a cell 255 indicative of an optical transmission T1 of the multilayer optical film 200 for the p-polarized incident light 22 propagating in the incident plane P that includes the first direction, for the at least one wavelength W1 in the infrared wavelength range 23, and for the incident angle θ of less than about 10 degrees.

Referring to FIGS. 1 and 2A-2B, as is apparent from the curve 211, for the substantially normally incident light 20 and for the visible wavelength range 21, the plurality of alternating polymeric first and second layers 10, 11 has the average optical transmission 30 of between about 10% and about 30% when the incident light 20 is polarized along the first direction in the multilayer optical film 200. In some embodiments, for the substantially normally incident light 20 and for the visible wavelength range 21, the plurality of alternating polymeric first and second layers 10, 11 has the average optical transmission 30 of between about 12% and about 25%, between about 14% and about 20%, between about 15% and about 20%, or between about 16% and about 20% when the incident light 20 is polarized along the first direction in the multilayer optical film 200.

In some embodiments, for the substantially normally incident light 20 and for the visible wavelength range 21, the plurality of alternating polymeric first and second layers 10, 11 has the average optical transmission 30 of about 18.64% when the incident light 20 is polarized along the first direction in the multilayer optical film 200. In some other embodiments, for the substantially normally incident light 20 and for the visible wavelength range 21, the plurality of alternating polymeric first and second layers 10, 11 has the average optical transmission 30 of about 20.57% when the incident light 20 is polarized along the first direction in the multilayer optical film 200.

Further, for the p-polarized incident light 22 propagating in the incident plane P that includes the first direction and for the at least one wavelength W1 in the infrared wavelength range 23, the plurality of alternating polymeric first and second layers 10, 11 has the optical transmission T1 for the incident angle θ of less than about 10 degrees.

In some embodiments, for the p-polarized incident light 22 propagating in the incident plane P that includes the first direction, for the at least one wavelength W1 of about 760 nm in the infrared wavelength range 23, and for the incident angle θ of 0 degree, the plurality of alternating polymeric first and second layers 10, 11 has the optical transmission T1 of about 33.93%. In some other embodiments, for the p-polarized incident light 22 propagating in the incident plane P that includes the first direction, for the at least one wavelength W1 of about 760 nm in the infrared wavelength range 23, and for the incident angle θ of 0 degree, the plurality of alternating polymeric first and second layers 10, 11 has the optical transmission T1 of about 38.86%.

As is apparent from the curve 212, for the substantially normally incident light 20 and for the visible wavelength range 21, the conventional optical film has an average optical transmission of less than about 5% when the incident light 20 is polarized along the first direction. In some embodiments, for the substantially normally incident light 20 and for the visible wavelength range 21, the conventional optical film has the average optical transmission of about 2.24% when the incident light 20 is polarized along the first direction.

Further, for the p-polarized incident light 22 propagating in the incident plane P that includes the first direction, for the at least one wavelength W1 of about 760 nm in the infrared wavelength range 23, and for the incident angle θ of about 0 degree, the conventional optical film has an optical transmission T1' of about 2.24%.

Therefore, as is apparent from the curves 211, 212, for the substantially normally incident light 20 and for the visible wavelength range 21, the average optical transmission 30 of the multilayer optical film 200 is greater than the average optical transmission of the conventional optical film when the incident light 20 is polarized along the first direction. Further, the optical transmission T1 of the multilayer optical film 200 is substantially greater than the optical transmission T1' of the conventional optical film.

As is apparent from the curve 213, for the substantially normally incident light 20 and for the visible wavelength range 21, the plurality of alternating polymeric first and second layers 10, 11 has the average optical transmission 31 of greater than about 60% when the incident light 20 is polarized along the second direction in the multilayer optical film 200. In some embodiments, for the substantially normally incident light 20 and for the visible wavelength range 21, the plurality of alternating polymeric first and second layers 10, 11 has the average optical transmission 31 of greater than about 65%, greater than about 70%, greater than about 75%, greater than about 80%, or greater than about 85% when the incident light 20 is polarized along the second direction in the multilayer optical film 200.

In some embodiments, for the substantially normally incident light 20 and for the visible wavelength range 21, the plurality of alternating polymeric first and second layers 10, 11 has the average optical transmission 31 of about 89% when the incident light 20 is polarized along the second direction in the multilayer optical film 200. In some other embodiments, for the substantially normally incident light 20 and for the visible wavelength range 21, the plurality of alternating polymeric first and second layers 10, 11 has the average optical transmission 31 of about 88.78% when the incident light 20 is polarized along the second direction in the multilayer optical film 200.

Further, for the p-polarized incident light 22 propagating in the incident plane P' that includes the second direction and for the at least one wavelength W1 in the infrared wavelength range 23, the plurality of alternating polymeric first and second layers 10, 11 has an optical transmission T1s for the incident angle θ of less than about 10 degrees.

In some embodiments, for the p-polarized incident light 22 propagating in the incident plane P' that includes the second direction, for the at least one wavelength W1 of about 760 nm in the infrared wavelength range 23, and for the incident angle θ of 0 degree, the plurality of alternating polymeric first and second layers 10, 11 has the optical transmission T1s of about 91.98%. In some other embodiments, for the p-polarized incident light 22 propagating in the incident plane P' that includes the second direction, for the at least one wavelength W1 of about 760 nm in the infrared wavelength range 23, and for the incident angle θ of 0 degree, the plurality of alternating polymeric first and second layers 10, 11 has the optical transmission T1s of about 89.89%.

Further, as is apparent from the curves 211, 213, for the substantially normally incident light 20 and for the visible wavelength range 21, the average optical transmission 30 of the plurality of alternating polymeric first and second layers 10, 11 when the incident light 20 is polarized along the first direction is less than the average optical transmission 31 of the plurality of alternating polymeric first and second layers 10, 11 when the incident light 20 is polarized along the second direction. Therefore, for the substantially normally incident light 20 and for the visible wavelength range 21, the multilayer optical film 200 may act as a reflective polarizer.

Referring to the curve 214, for the substantially normally incident light 20 and for the visible wavelength range 21, the conventional optical film has an average optical transmission of about 88.49% when the incident light 20 is polarized along the second direction.

Further, for the p-polarized incident light 22 propagating in the incident plane P' that includes the second direction, for the at least one wavelength W1 of about 760 nm in the infrared wavelength range 23, and for the incident angle θ of about 0 degree, the conventional optical film has an optical transmission T1s' of about 89.79%.

As is apparent from the curves 213, 214, for the substantially normally incident light 20 and for the visible wavelength range 21, the average optical transmission of the multilayer optical film 200 is comparable to the average optical transmission of the conventional optical film when the incident light 20 is polarized along the second direction.

Further, the optical transmission T1s of the multilayer optical film 200 is comparable to the optical transmission T1s' of the conventional optical film.

As is apparent from the curves 211 to 214, the average optical transmission 30 of the multilayer optical film 200 is greater than the average optical transmission of the conventional optical film for the substantially normally incident light 20 and for the visible wavelength range 21 when the incident light 20 is polarized along the first direction. Therefore, the multilayer optical film 200 may be a weaker reflective polarizer than the conventional optical film. The weaker reflective polarizer may be desirable in several optical applications, for example, windshield, Virtual Reality/Augmented Reality, and heads-up display (HUD) applications.

Figure 2C:
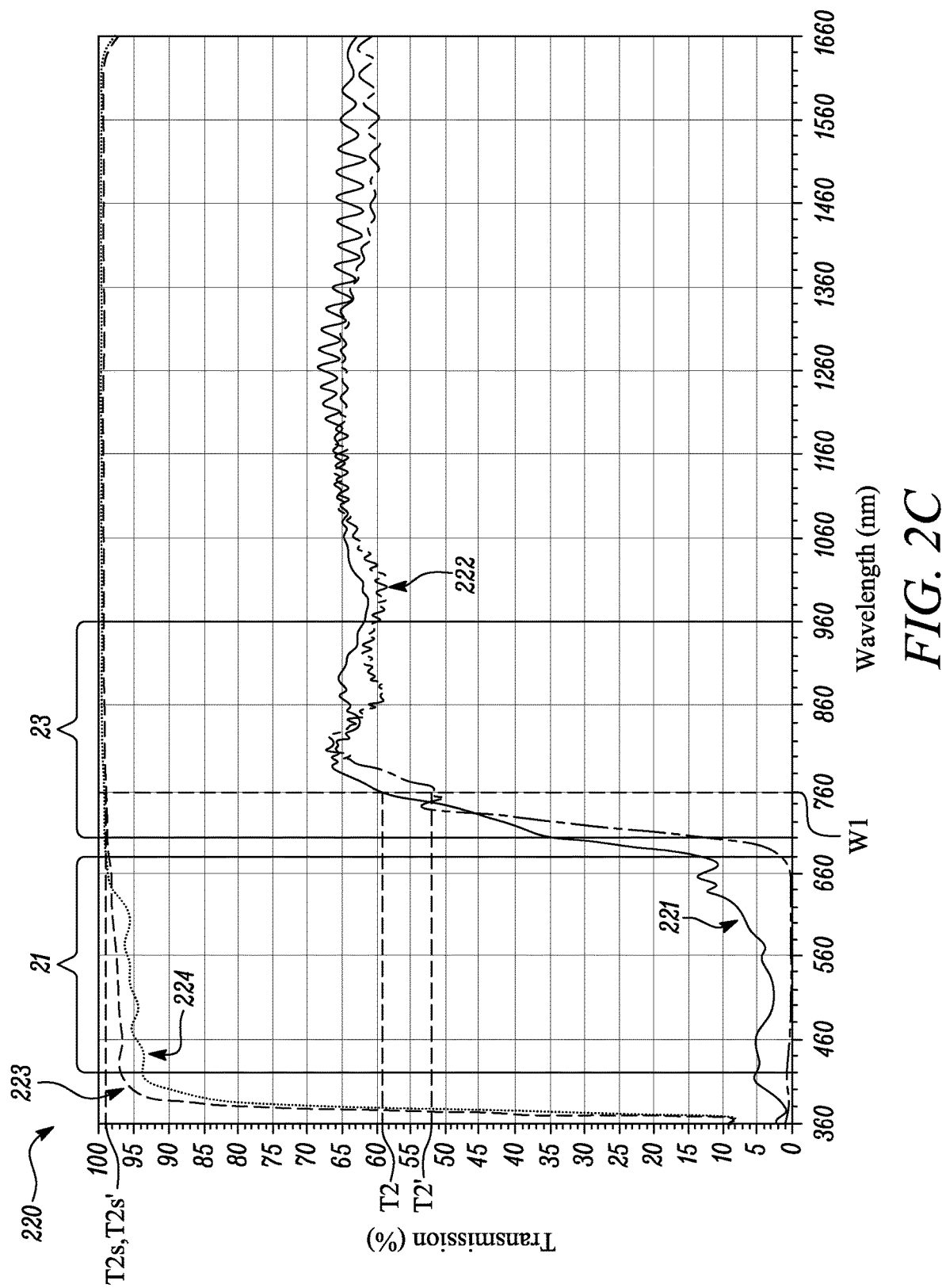
FIG. 2C illustrates a plot depicting respective optical transmissions of the multilayer optical film of FIG. 1 and the conventional optical film for an incident angle of greater than about 40 degrees, according to an embodiment of the present disclosure.

FIG. 2C illustrates a plot 220 depicting respective optical transmissions of the multilayer optical film 200 (shown in FIG. 1) and the conventional optical film for the p-polarized incident light 22 propagating in the incident plane P that includes the first direction (shown in FIG. 1) and the p-polarized incident light 22 propagating in the incident plane P' that includes the second direction, and incident at the incident angle θ of greater than about 40 degrees, according to an embodiment of the present disclosure. Wavelength is expressed in nanometers (nm) in the abscissa. Optical transmission is expressed as a transmission percentage in the left ordinate axis.

Referring now to FIGS. 1 and 2C, the plot 220 includes a curve 221 corresponding to the optical transmission of the plurality of alternating polymeric first and second layers 10, 11 for the p-polarized incident light 22 propagating in the incident plane P that includes the first direction and for the incident angle θ of greater than about 40 degrees.

The plot 220 further includes a curve 222 corresponding to the optical transmission of the conventional optical film for the p-polarized incident light 22 propagating in the incident plane P that includes the first direction and for the incident angle θ of greater than about 40 degrees.

The plot 220 further includes a curve 223 corresponding to the optical transmission of the plurality of alternating polymeric first and second layers 10, 11 for the p-polarized incident light 22 propagating in the incident plane P' that includes the second direction and for the incident angle θ of greater than about 40 degrees.

The plot 220 further includes a curve 224 corresponding to the optical transmission of the conventional optical film for the p-polarized incident light 22 propagating in the incident plane P' that includes the second direction and for the incident angle θ of greater than about 40 degrees.

FIG. 2D illustrates a table 260 listing some exemplary values of respective average optical transmissions of the multilayer optical film 200 (shown in FIG. 1) and the conventional optical film for the p-polarized incident light 22 (shown in FIG. 1) propagating in the incident plane P that includes the first direction and the p-polarized incident light 22 propagating in the incident plane P' that includes the second direction, incident at the incident angle θ of greater than about 40 degrees, and for the visible wavelength range 21. The table 260 further lists some exemplary values of respective optical transmissions of the multilayer optical film 200 and the conventional optical film for the p-polarized incident light 22 propagating in the incident plane P that includes the first direction and the p-polarized incident light 22 propagating in the incident plane P' that includes the second direction, incident at the incident angle θ of greater than about 40 degrees, and for the at least one wavelength W1 in the infrared wavelength range 23. The table 260 corresponds to the plot 220 of FIG. 2C.

The table 260 includes multiple column headings in a row 261. The column headings in the row 261 includes the p-polarized incident light 22 propagating in the incident plane P that includes the first direction and the p-polarized incident light 22 propagating in the incident plane P' that includes the second direction. The table 260 further includes multiple column sub-headings in a row 262. The column sub-headings in the row 262 includes the multilayer optical film 200 and the conventional optical film for each of the p-polarized incident light 22 propagating in the incident plane P that includes the first direction and the p-polarized incident light 22 propagating in the incident plane P' that includes the second direction. A column 263 includes the visible wavelength range 21 (about 420 nm to about 680 nm) and the at least one wavelength W1 (about 760 nm) in the infrared wavelength range 23 (about 700 nm to about 960 nm).

The table 260 includes a cell 265 indicative of an optical transmission T2 of the multilayer optical film 200 for the p-polarized incident light 22 propagating in the incident plane P that includes the first direction, for the incident angle θ of greater than about 40 degrees, and for the at least one wavelength W1 in the infrared wavelength range 23.

Referring to FIGS. 1 and 2C-2D, as is apparent from the curve 221, in some embodiments, for the p-polarized incident light 22 propagating in the incident plane P that includes the first direction, for the visible wavelength range 21, and for the incident angle θ of about 60 degrees, the plurality of alternating polymeric first and second layers 10, 11 has the average optical transmission of about 6.19%. In some other embodiments, for the p-polarized incident light 22 propagating in the incident plane P that includes the first direction, for the visible wavelength range 21, and for the incident angle θ of about 60 degrees, the plurality of alternating polymeric first and second layers 10, 11 has the average optical transmission of about 8.12%.

Further, for the p-polarized incident light 22 propagating in the incident plane P that includes the first direction and for the at least one wavelength W1 in the infrared wavelength range 23, the plurality of alternating polymeric first and second layers 10, 11 has the optical transmission T2 for the incident angle θ of greater than about 40 degrees.

In some embodiments, for the p-polarized incident light 22 propagating in the incident plane P that includes the first direction, for the at least one wavelength W1 of about 760 nm in the infrared wavelength range 23, and for the incident angle θ of about 60 degrees, the plurality of alternating polymeric first and second layers 10, 11 has the optical transmission T2 of about 58.8%. In some other embodiments, for the p-polarized incident light 22 propagating in the incident plane P that includes the first direction, for the at least one wavelength W1 of about 760 nm in the infrared wavelength range 23, and for the incident angle θ of about 60 degrees, the plurality of alternating polymeric first and second layers 10, 11 has the optical transmission T2 of about 56.15%.

As is apparent from the curve 221 and the curve 211 (shown in FIG. 2A), for the p-polarized incident light 22 propagating in the incident plane P that includes the first direction and for the at least one wavelength W1 in the infrared wavelength range 23, the plurality of alternating polymeric first and second layers 10, 11 has the optical transmissions T1 and T2 for respective incident angles θ of less than about 10 degrees and greater than about 40 degrees.

Further, a difference between T2 and T1 is less than about 40%, i.e., (T2−T1)<40%. In some embodiments, (T2−T1)<35%, (T2−T1)<30%, or (T2−T1)<25%.

In some embodiments, for the p-polarized incident light 22 propagating in the incident plane P that includes the first direction, for the at least one wavelength W1 of about 760 nm in the infrared wavelength range 23, T1 is about 33.93% and T2 is about 58.8%. Therefore, in such embodiments, (T2−T1) is about 24.87%.

In some other embodiments, for the p-polarized incident light 22 propagating in the incident plane P that includes the first direction, for the at least one wavelength W1 of about 760 nm in the infrared wavelength range 23, T1 is about 38.86% and T2 is about 56.15%. Therefore, in such embodiments, (T2−T1) is about 17.29%.

As is apparent from the curve 222, for the p-polarized incident light 22 propagating in the incident plane P that includes the first direction and for the visible wavelength range 21, the conventional optical film has an average optical transmission of about 0.35% for the incident angle θ of about 60 degrees.

Further, for the p-polarized incident light 22 propagating in the incident plane P that includes the first direction and for the at least one wavelength W1 of about 760 nm in the infrared wavelength range 23, the conventional optical film has an optical transmission T2' of about 52.43% for the incident angle θ of about 60 degrees.

As is apparent from the curve 212 (shown in FIG. 2A), and the curve 222, for the conventional optical film, for the p-polarized incident light 22 propagating in the incident plane P that includes the first direction, for the at least one wavelength W1 of about 760 nm in the infrared wavelength range 23, T1' is about 2.24% and T2' is about 52.43%. Therefore, (T2'−T1') is about 50.19%.

Thus, the difference between T2 and T1 for the multilayer optical film 200 is less than the difference between T2' and T1' for the conventional optical film.

As is apparent from the curve 223, in some embodiments, for the p-polarized incident light 22 propagating in the incident plane P' that includes the second direction, for the visible wavelength range 21, and for the incident angle θ of about 60 degrees, the plurality of alternating polymeric first and second layers 10, 11 has an average optical transmission of about 97.64%. In some other embodiments, for the p-polarized incident light 22 propagating in the incident plane P' that includes the second direction, for the visible wavelength range 21, and for the incident angle θ of about 60 degrees, the plurality of alternating polymeric first and second layers 10, 11 has an average optical transmission of about 97.04%.

Further, for the p-polarized incident light 22 propagating in the incident plane P' that includes the second direction and for the at least one wavelength W1 in the infrared wavelength range 23, the plurality of alternating polymeric first and second layers 10, 11 has an optical transmission T2s for the incident angle θ of greater than about 40 degrees.

In some embodiments, for the p-polarized incident light 22 propagating in the incident plane P' that includes the second direction, for the at least one wavelength W1 of about 760 nm in the infrared wavelength range 23, and for the incident angle θ of about 60 degrees, the plurality of alternating polymeric first and second layers 10, 11 has the optical transmission T2s of about 99.11%. In some other embodiments, for the p-polarized incident light 22 propagating in the incident plane P' that includes the second direction, for the at least one wavelength W1 of about 760 nm in the infrared wavelength range 23, and for the incident angle θ of about 60 degrees, the plurality of alternating polymeric first and second layers 10, 11 has the optical transmission T2s of about 98.61%.

As is apparent from the curve 224, for the p-polarized incident light 22 propagating in the incident plane P' that includes the second direction, for the visible wavelength range 21, and for the incident angle θ of about 60 degrees, the conventional optical film has an average optical transmission of about 95.95%.

Further, for the p-polarized incident light 22 propagating in the incident plane P' that includes the second direction, for the at least one wavelength W1 of about 760 nm in the infrared wavelength range 23, and for the incident angle θ of about 60 degrees, the conventional optical film has an optical transmission T2s' of about 99.4%.

Figure 3A:
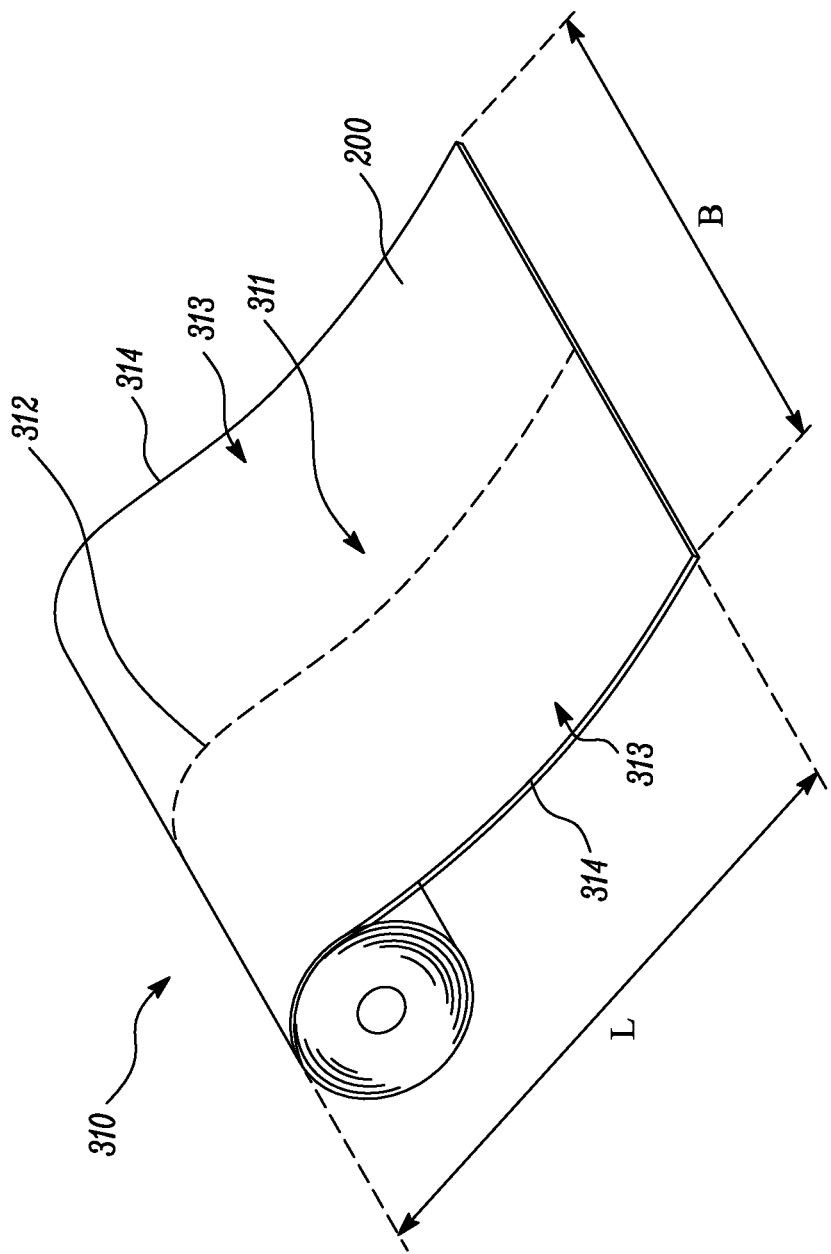
FIG. 3A illustrates a perspective view of a roll of the multilayer optical film of FIG. 1, according to an embodiment of the present disclosure.

FIG. 3A illustrates a perspective view of a roll 310 of the multilayer optical film 200, according to an embodiment of the present disclosure. The multilayer optical film 200 may be wound into the roll 310 during commercial manufacture of the multilayer optical film 200. The multilayer optical film 200 may be wound into the roll 310 by a roll-to-roll process during the manufacture of the multilayer optical film 200. The multilayer optical film 200 includes a middle region 311 defined proximate a central axis 312 of the multilayer optical film 200 and side regions 313 defined proximate respective edges 314 of the multilayer optical film 200.

In some embodiments, the multilayer optical film 200 has a width B of at least 140 centimeters (cm). The width B may be defined between the edges 314 of the multilayer optical film 200. In some embodiments, the multilayer optical film 200 has the width B of at least 145 cm, at least 150 cm, at least 170 cm, at least 190 cm, at least 200 cm, at least 210 cm, at least 220 cm, or at least 225 cm.

In some embodiments, the multilayer optical film 200 has a length L of at least 40 meters (m). The length L may be defined along the central axis 312 of the multilayer optical film 200. The length L is shown partially in FIG. 3A for the purpose of illustration. In some embodiments, the multilayer optical film 200 has the length L of at least 50 m, at least 75 m, at least 95 m, at least 100 m, at least 125 m, at least 150 m, at least 175 m, at least 200 m, at least 300 m, at least 400 m, or at least 500 m.

Figure 3B:
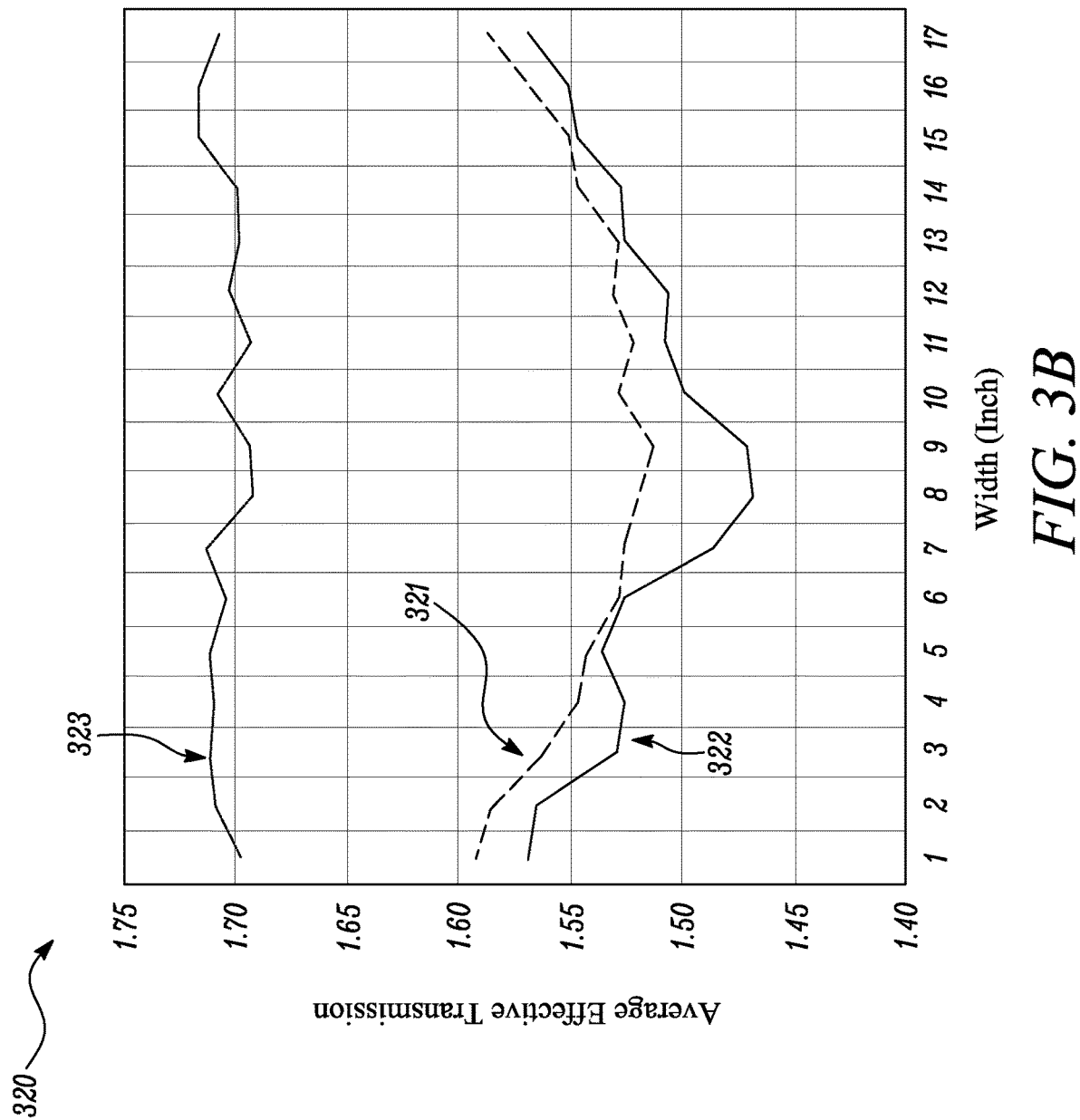
FIG. 3B illustrates a plot depicting respective variations in average effective transmissions across respective widths of two multilayer optical films and a conventional optical film, according to an embodiment of the present disclosure.

FIG. 3B illustrates a plot 320 depicting respective variations in average effective transmissions of the roll 310 (shown in FIG. 3A) of the multilayer optical film 200 (shown in FIG. 3A) along the length L and across the width B (shown in FIG. 3A) of the multilayer optical film 200 and a roll of the conventional optical film along a length and across a width of the conventional optical film, according to an embodiment of the present disclosure. The width is expressed in inches in the abscissa. The average effective transmission is expressed on the ordinate. The width B of the multilayer optical film 200 and the width of the conventional optical film is about 17 inches.

The term "average effective transmission" as used herein refers to an average luminous transmittance of substantially normally incident light. The substantially normally incident light may be an unpolarized light, or a polarized light. The average effective transmission is an effective transmission determined over, or averaged over, substantially an entire area of the multilayer optical film 200 or the conventional optical film, or determined over, or averaged over, an area sufficiently large (e.g., a diameter of at least about 0.5 mm, or at least about 1 mm, or at least about 5 mm) to average out effects of local nonuniformities (e.g., clustering of particles). The average effective transmission may be determined as the luminous transmission determined according to ASTM D1003-13. As indicated in the ASTM D1003-13 test standard, the luminous transmittance is transmission weighted according to the spectral luminous efficiency function V(λ) of the 1987 Commission Internationale de l'Éclairage (CIE).

The plot 320 includes a curve 321 depicting the variation of the average effective transmission of the multilayer optical film 200 along the length L and across the width B of the multilayer optical film 200, according to a first embodiment of the present disclosure.

The plot 320 includes a curve 322 depicting the variation of the average effective transmission of the multilayer optical film 200 along the length L and across the width B of the multilayer optical film 200, according to a second embodiment of the present disclosure.

The plot 320 further includes a curve 323 depicting the variation of the average effective transmission of the conventional optical film along the length and across the width of the conventional optical film.

FIG. 3C illustrates a table 350 listing some exemplary values of the average effective transmissions of the multilayer optical films 200 according to the first and second embodiments, and the conventional optical film along respective lengths and across respective widths.

The table 350 includes multiple column headings in a row 351. The column headings in the row 351 includes the multilayer optical film 200 according to first embodiment, the multilayer optical film 200 according to second embodiment, and the conventional optical film. A column 352 includes the respective widths of the multilayer optical film 200 according to first embodiment, the multilayer optical film 200 according to second embodiment, and the conventional optical film, respective minimum average effective transmission ET1, respective maximum average effective transmission ET2, and a ratio between ET1 and ET2. The table 350 further includes multiple cells corresponding to different values of the average effective transmissions of the multilayer optical film 200 according to first embodiment, the multilayer optical film 200 according to second embodiment, and the conventional optical film across the respective widths of the multilayer optical film 200 according to first embodiment, the multilayer optical film 200 according to second embodiment, and the conventional optical film.

Referring to FIGS. 3A-3C, as is apparent from the curves 321, 322, the multilayer optical films 200 according to the first and second embodiments have the respective minimum average effective transmissions ET1 in the respective middle regions 311 (at about 9 inches). Further, the multilayer optical films 200 according to the first and second embodiments have the respective maximum average effective transmissions ET2 in the respective side regions 313 (at about 1 and at about 17 inches).

Therefore, along the length L of the multilayer optical film 200, the multilayer optical film 200 has the average effective transmission ET1 in the middle region 311 and the average effective transmission ET2 in the side region 313.

In some embodiments, the ratio between ET1 and ET2 is less than or equal to about 0.97, i.e., (ET1/ET2)≤0.97. In some embodiments, (ET1/ET2)≤0.96, (ET1/ET2)≤0.95, or (ET1/ET2)≤0.94. Therefore, the average effective transmission ET2 in the side region 313 of the multilayer optical film 200 is greater than the average effective transmission ET1 in the middle region 311 of the multilayer optical film 200.

In some embodiments, ET1 is about 1.513 and ET2 is about 1.593. Therefore, (ET1/ET2) is about 0.95. In some embodiments, ET1 is about 1.468 and ET2 is about 1.569. Therefore, (ET1/ET2) is about 0.936.

Further, the multilayer optical film 200 has the average effective transmission of less than about 1.68. In some embodiments, the multilayer optical film 200 has the average effective transmission of less than about 1.66, less than about 1.64, less than about 1.62, less than about 1.6, less than about 1.58, less than about 1.56, less than about 1.54, less than about 1.52, less than about 1.5, or less than about 1.48. In some embodiments, the multilayer optical film 200 has the average effective transmission of between about 1.65 and about 1.4. In some embodiments, the multilayer optical film 200 has the average effective transmission of between about 1.63 and about 1.42, or between about 1.61 and about 1.44.

Referring to the curve 323, in some embodiments, the conventional optical film has the average effective transmission ET1 of about 1.693 and the average effective transmission ET2 of about 1.717. Therefore, (ET1/ET2) is about 0.986. Therefore, for the conventional optical film, the average effective transmissions ET1 and ET2 are substantially similar. As is apparent from the curve 323, the conventional optical film shows a substantially flat profile.

In some embodiments, the multilayer optical film 200 has a suitable chemical resistance against one or more solvents, such as isopropyl alcohol (IPA), acetone, toluene, and methyl ethyl ketone (MEK). In some embodiments, applying one or more of IPA, acetone, toluene, and MEK to the multilayer optical film 200 does not damage the multilayer optical film 200. In some embodiments, damage to the multilayer optical film 200 may be assessed by measuring an optical haze of the multilayer optical film 200 before and after application of the one or more solvents to the multilayer optical film 200. Generally, application of the one or more solvents to the multilayer optical film 200 may increase the optical haze of the multilayer optical film 200.

The term "optical haze" as used herein refers to the scattering of light as it passes through a material. It refers to the specific light-transmitting and wide-angle-light scattering properties of planar sections of a material. The optical haze may be determined in accordance with ASTM D-1003-07 ("Standard Test Method for Haze and Luminous Transmittance of Transparent Plastics"). The optical haze values are reported in percent. A material having a high haze value is generally a material that is more cloudy and less transparent. A material having a low haze value is generally a material that is less cloudy and more transparent.

In some embodiments, the application of the one or more of IPA, acetone, toluene and MEK to the multilayer optical film 200 increases the optical haze of the multilayer optical film 200 by no more than about 10%. In some embodiments, the application of the one or more of IPA, acetone, toluene and MEK to the multilayer optical film 200 increases the optical haze of the multilayer optical film 200 by no more than about 8%, no more than about 6%, no more than about 5%, no more than about 4%, no more than about 2%, or no more than about 1%. Therefore, the increase in the optical haze of the multilayer optical film 200 after application of the one or more solvents is substantially less, indicating that the multilayer optical film 200 has a high chemical resistance against the one or more solvents.

Figure 4A:
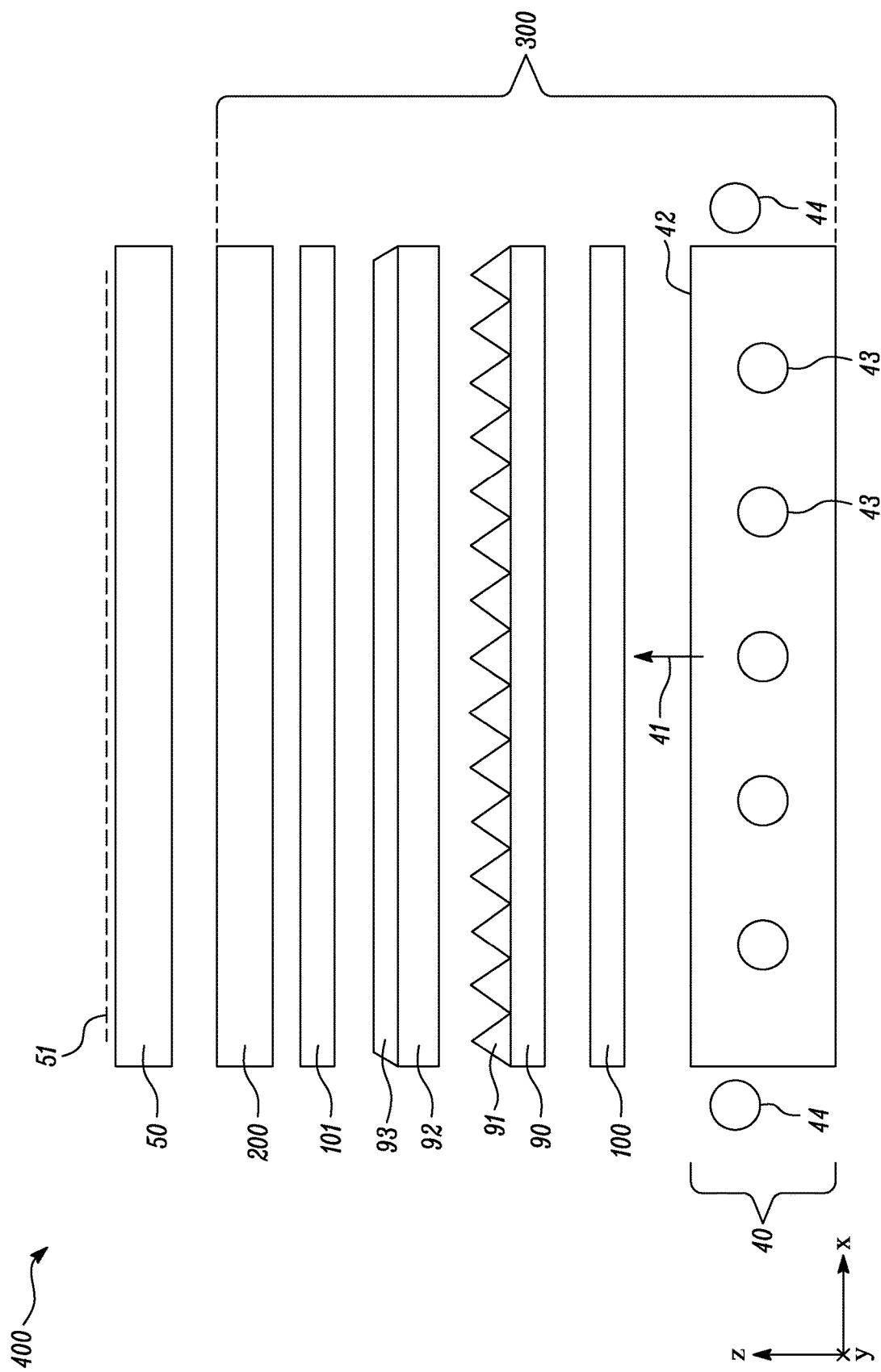
FIG. 4A illustrates a detailed schematic sectional view of a display system, according to an embodiment of the present disclosure.

FIG. 4A illustrates a detailed schematic sectional view of a display system 400, according to an embodiment of the present disclosure. The display system 400 includes a display panel 50 disposed on a backlight 300. The backlight 300 includes an extended illumination source 40 configured to emit a light 41 through an across an extended emission surface 42 thereof for illuminating the display panel 50. The extended illumination source 40 includes at least one light source 43, 44. In the illustrated embodiment of FIG. 4A, the extended illumination source 40 includes two light sources 43, 44. Therefore, the at least one light source 43, 44 includes the two light sources 43, 44. The light source 43 may be disposed in-line and the light source 44 may be disposed at an edge of the extended illumination source 40. In the illustrated embodiment of FIG. 4A, the extended illumination source 40 includes multiple light sources 43 disposed in an in-line configuration. Further, the extended illumination source 40 includes at least two light sources 44 disposed on opposing edges of the extended illumination source 40.

The backlight 300 further includes the multilayer optical film 200. The multilayer optical film 200 is disposed on, and substantially coextensive in length and width with, the extended emission surface 42.

The light 41 may be interchangeably referred to as "the emitted light 41". The display panel 50 is configured to receive the emitted light 41 and form an image 51.

In some embodiments, the backlight 300 includes a first prismatic film 90 disposed between the multilayer optical film 200 and the extended illumination source 40. In some embodiments, the first prismatic film 90 may be a brightness enhancement film. In some embodiments, the first prismatic film 90 includes a plurality of first prisms 91 extending along a first longitudinal direction. In some embodiments, the first longitudinal direction may be along the y-axis.

In some embodiments, the backlight 300 further includes a second prismatic film 92 disposed between the multilayer optical film 200 and the first prismatic film 90. In some embodiments, the second prismatic film 92 includes a plurality of second prisms 93 extending along a second longitudinal direction different than the first longitudinal direction. In some embodiments, the second longitudinal direction may be along the x-axis.

In some embodiments, the backlight 300 further includes at least one optical diffuser film 100, 101 disposed between the multilayer optical film 200 and the extended illumination source 40 and configured to receive and scatter the emitted light 41. In the illustrated embodiment of FIG. 4A, the at least one optical diffuser film 100, 101 includes two optical diffuser films 100, 101. The optical diffuser film 100 is disposed between the extended illumination source 40 and the first prismatic film 90. The optical diffuser film 101 is disposed between the second prismatic film 92 and the multilayer optical film 200.

Figure 4B:
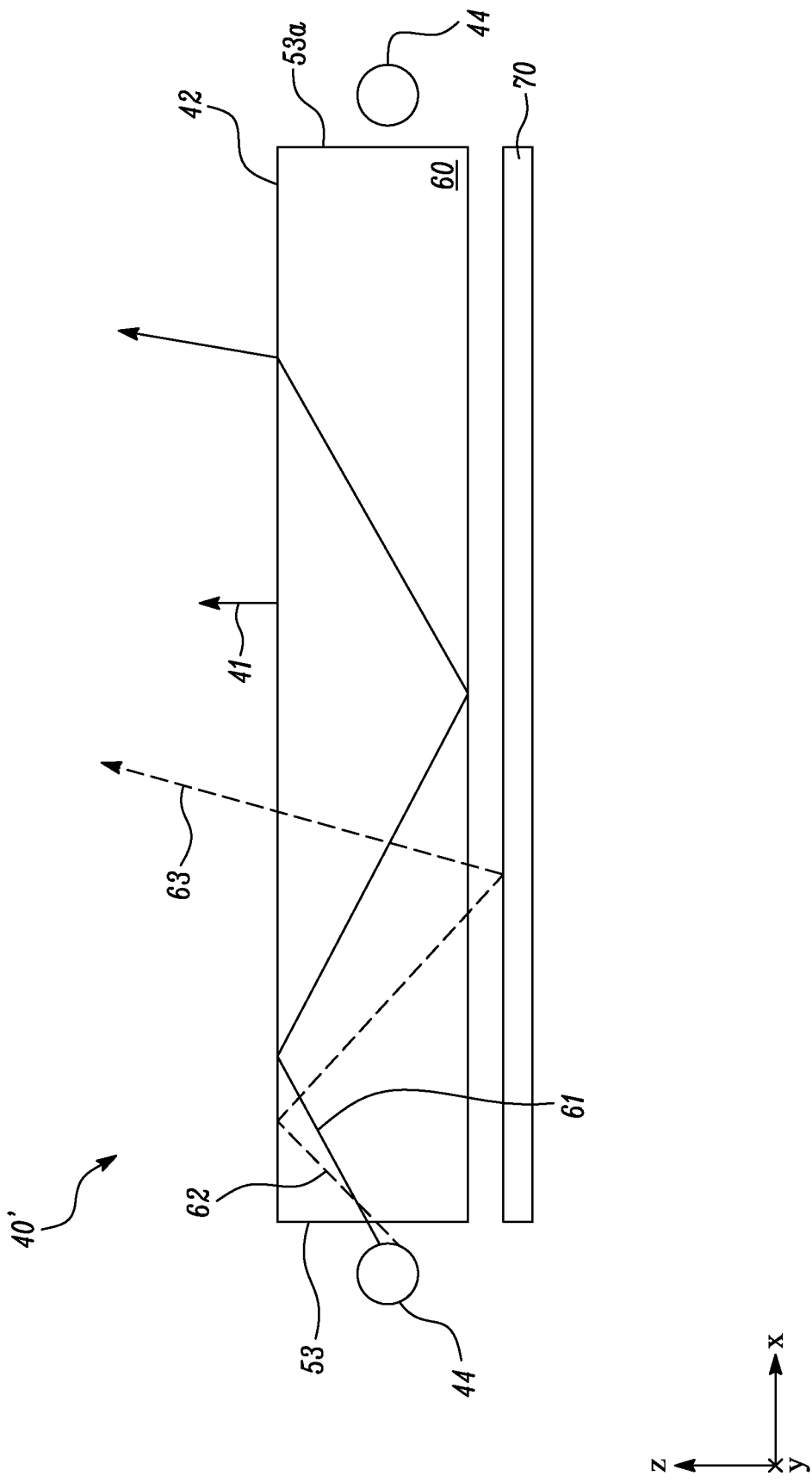
FIG. 4B illustrates a detailed schematic sectional view of an extended illumination source of the display system of FIG. 4A, according to an embodiment of the present disclosure.

FIG. 4B illustrates a detailed schematic sectional view of an extended illumination source 40', according to an embodiment of the present disclosure. In some embodiments, the extended illumination source 40' may be used in the backlight 300 in place of the extended illumination source 40 (shown in FIG. 4A). In some embodiments, the extended illumination source 40' includes a lightguide 60 for propagating light 61, 62 therein along a length and a width of the lightguide 60 primarily by total internal reflection. In some embodiments, the length of the lightguide 60 is along the x-axis and the width of the lightguide 60 is along the y-axis. In some embodiments, the lightguide 60 is a solid lightguide. In some embodiments, the lightguide 60 is a substantially hollow lightguide.

In some embodiments, the lightguide 60 includes the extended emission surface 42.

In some embodiments, the extended illumination source 40' further includes the at least one light source 44 disposed proximate a side surface 53, 53a of the lightguide 60. In the illustrated embodiment of FIG. 4B, the at least one light source 44 includes two light sources. One of the two light sources 44 is disposed proximate the side surface 53, and the other of the two light sources 44 is disposed proximate the side surface 53a.

In some embodiments, the extended illumination source 40' includes a back reflector 70 configured to reflect the light 62 that exits the lightguide 60 towards the back reflector 70. In some embodiments, the back reflector 70 may reflect the light 62 back towards the lightguide 60. The light reflected from the back reflector 70 may be referred to as "the reflected light 63". In some embodiments, the reflected light 63 exits the extended illumination source 40' through the extended emission surface 42.

In some embodiments, the back reflector 70 may be highly reflective. For example, the back reflector 70 may have an on-axis average reflectivity of at least 90%, 95%, 98%, 99%, or more. Such reflectivity values may include both specular and diffuse reflections. In some embodiments, the back reflector 70 may be a predominantly specular, diffuse, or combination of specular/diffuse reflector, whether spatially uniform or patterned. In some embodiments, the back reflector 70 may be a semi-specular reflector. In some cases, the back reflector 70 may include a stiff metal substrate with a high reflectivity coating, or a high reflectivity film laminated to a supporting substrate. In some embodiments, the back reflector 70 may include one or more elements, such as silver, aluminum, a white coating, a non-conductive coating, etc.

Figure 4C:
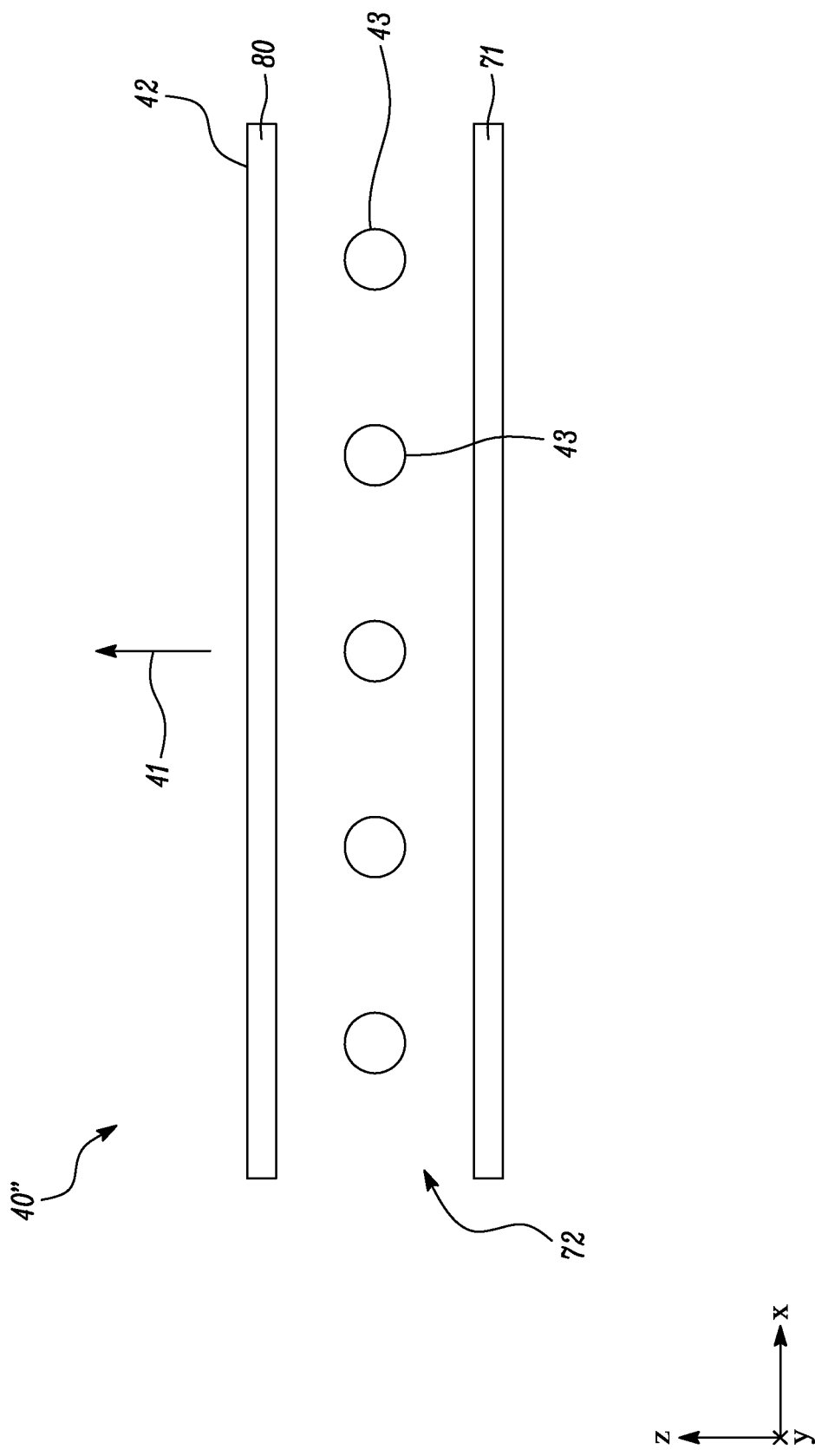
FIG. 4C illustrates a detailed schematic sectional view of an extended illumination source of the display system of FIG. 4A, according to another embodiment of the present disclosure.

FIG. 4C illustrates a detailed schematic sectional view of an extended illumination source 40", according to another embodiment of the present disclosure. In some embodiments, the extended illumination source 40" may be used in the backlight 300 in place of the extended illumination source 40 (shown in FIG. 4A). In some embodiments, the extended illumination source 40" includes an optically diffusive layer 80 for scattering light. In some embodiments, the optically diffusive layer 80 may include any suitable diffuser film or plate configured to diffuse or scatter light. For example, the optically diffusive layer 80 may diffuse light through use of a textured surface of a substrate, or through other means, such as incorporation of light diffusing particles within a matrix of the film. In some embodiments, the optically diffusive layer 80 may be substantially similar to the optical diffuser film 100 or the optical diffuser film 100.

In some embodiments, the optically diffusive layer 80 includes the extended emission surface 42. In some embodiments, the extended illumination source 40" includes a back reflector 71 facing the optically diffusive layer 80. The back reflector 71 may be substantially similar to the back reflector 70 shown in FIG. 4B. In some embodiments, the back reflector 71 and the optically diffusive layer 80 define an optical cavity 72 therebetween. In some embodiments, the at least one light source 43 is disposed in the optical cavity 72. In some embodiments, the optical cavity 72 may form a recycling cavity.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A multilayer optical film comprising a plurality of alternating polymeric first and second layers numbering at least 20 in total, each of the polymeric first and second layers having an average thickness of less than about 500 nanometers (nm), the polymeric first layers comprising between about 10% and about 50% by weight of polyethylene terephthalate (PET) and between about 50% and about 90% by weight of polyethylene naphthalate (PEN), such that for a substantially normally incident light and for a visible wavelength range extending from about 420 nm to about 680 nm, the plurality of alternating polymeric first and second layers has:

an average optical transmission of between about 10% and about 30% when the incident light is polarized along an in-plane first direction in the multilayer optical film; and an average optical transmission of greater than about 60% when the incident light is polarized along an in-plane orthogonal second direction in the multilayer optical film;

wherein, for a p-polarized incident light propagating in an incident plane that comprises the first direction and for at least one wavelength in an infrared wavelength range extending from about 700 nm to about 960 nm, the plurality of alternating polymeric first and second layers has optical transmissions T1 and T2 for respective incident angles of less than about 10 degrees and greater than about 40 degrees, and wherein T2−T1 is less than about 40%.

2. The multilayer optical film of claim 1, wherein the polymeric first and second layers have respective indices nx1 and nx2 along the first direction, respective indices ny1 and ny2 along the second direction, and respective indices nz1 and nz2 along a thickness direction of the multilayer optical film orthogonal to the first and second directions, such that for at least one wavelength in the visible wavelength range:

$$0 \leq nx1-nx2 \leq 0.4;$$

a magnitude of a difference between ny1 and ny2 is less than about 0.04; and a magnitude of a difference between nz1 and nz2 is less than about 0.04.

3. A roll of the multilayer optical film of claim 1, having a width of at least 140 centimeters (cm) and a length of at least 40 meters (m), wherein along the length of the multilayer optical film, the multilayer optical film has an average effective transmission ET1 in a middle region and an average effective transmission ET2 in a side region, ET1/ET2≤0.97.

4. A backlight comprising:
an extended illumination source configured to emit a light through and across an extended emission surface thereof for illuminating a display panel, the extended illumination source comprising at least one light source; and
the multilayer optical film of claim 1 disposed on, and substantially coextensive in length and width with, the extended emission surface.

5. The backlight of claim 4, wherein the extended illumination source comprises:
a lightguide for propagating light therein along a length and a width of the lightguide primarily by total internal reflection, the lightguide comprising the extended emission surface;
the at least one light source disposed proximate a side surface of the lightguide; and
a back reflector configured to reflect the light that exits the lightguide toward the back reflector, the reflected light exiting the extended illumination source through the extended emission surface.

6. The backlight of claim 4, wherein the extended illumination source comprises:
an optically diffusive layer for scattering light and comprising the extended emission surface;
a back reflector facing the optically diffusive layer, the back reflector and the optically diffusive layer defining an optical cavity therebetween; and
the at least one light source disposed in the optical cavity.

7. A display system comprising:
a display panel disposed on the backlight of claim 6, the display panel configured to receive the emitted light and form an image.

8. The multilayer optical film of claim 1, wherein a minimum average peel strength between two portions of the multilayer optical film is greater than about 100 grams per inch (g/inch), and wherein each of the two portions comprises at least one polymeric layer in the plurality of alternating polymeric first and second layers.

9. A backlight comprising:
an extended illumination source configured to emit a light through and across an extended emission surface thereof for illuminating a display panel, the extended illumination source comprising at least one light source; and
a reflective polarizer disposed on, and substantially co-extensive in length and width with, the extended illumination source, the reflective polarizer comprising a plurality of alternating polymeric first and second layers numbering at least 20 in total, each of the polymeric first and second layers having an average thickness of less than about 500 nm, such that for a substantially normally incident light and for a visible wavelength range extending from about 420 nm to about 680 nm, the plurality of alternating polymeric first and second layers has:
an average optical transmission of between about 10% and about 30% when the incident light is polarized along an in-plane first direction in the reflective polarizer; and
an average optical transmission of greater than about 60% when the incident light is polarized along an in-plane orthogonal second direction in the reflective polarizer,
wherein, the reflective polarizer has an average effective transmission of between about 1.65 and about 1.4.

10. The backlight of claim 9, wherein the polymeric first layers comprise between about 10% and about 50% by weight of PET and between about 50% and about 90% by weight of PEN.

11. The backlight of claim 9, wherein for a p-polarized incident light propagating in an incident plane that comprises the first direction and for at least one wavelength in an infrared wavelength range extending from about 700 nm to about 960 nm, the plurality of alternating polymeric first and second layers has optical transmissions T1 and T2 for respective incident angles of less than about 10 degrees and greater than about 40 degrees, and wherein T2−T1 is less than about 40%.

12. The backlight of claim 9, wherein the polymeric second layers comprise polycarbonate and a copolymer of PET.

13. A display system comprising the backlight of claim 9 and a display panel disposed on the backlight, the display panel configured to receive the emitted light and form an image.

* * * * *